United States Patent [19]
Furay

[11] Patent Number: 5,502,604
[45] Date of Patent: Mar. 26, 1996

[54] DISK DRIVE WITH RAIL MOUNTING ARRANGEMENT

[75] Inventor: David M. Furay, Boulder, Colo.

[73] Assignee: Intégral Peripherals, Inc., Boulder, Colo.

[21] Appl. No.: 291,249

[22] Filed: Aug. 16, 1994

Related U.S. Application Data

[63] Continuation of Ser. No. 958,858, Oct. 8, 1992, abandoned.

[51] Int. Cl.⁶ .............................. G11B 5/012; H05K 7/02
[52] U.S. Cl. .................................. 360/97.01; 360/98.01; 361/685
[58] Field of Search ............................. 360/97.01, 97.02, 360/97.03, 97.04, 133, 137, 900, 901, 902, 903, 98.01; 361/683–685, 739, 741

[56] References Cited

U.S. PATENT DOCUMENTS

| | | | |
|---|---|---|---|
| 4,908,715 | 3/1990 | Krum et al. | 360/97.02 |
| 5,098,175 | 3/1992 | Cooke et al. | 312/341.1 |
| 5,179,482 | 1/1993 | Tanaka et al. | 360/97.01 |
| 5,204,794 | 4/1993 | Yoshida | 360/97.01 |
| 5,243,495 | 9/1993 | Read et al. | 360/97.01 |
| 5,282,099 | 1/1994 | Kawagoe et al. | 360/97.01 |

OTHER PUBLICATIONS

Single page entitled "TYPE III".
Single page entitled "TYPE 4".
Single page entitled "TYPE-5".
Henry W. Ott, "Noise Reduction Techniques In Electronic Systems", 2nd Edition, John Wiley & Sons, 1936, pp. 188–191.
"PC Card Standard", Release 2.0, Personal Computer Memory Card International Association (PCMCIA), Sep. 1991, 42 pages.
PCMCIA Technical Committee Meeting Minutes, Santa Clara, CA, May 6–7 1992, 18 pages.

Primary Examiner—Stuart S. Levy
Assistant Examiner—George J. Letscher
Attorney, Agent, or Firm—Skjerven, Morrill, MacPherson, Franklin, & Friel

[57] ABSTRACT

A disk drive package including a pair of side rails and a connector is disclosed. The disk drive may advantageously be connected to a personal computer, in a location normally reserved for a memory card. The disk drive may be constructed to conform to specifications issued by the Personal Computer Memory Card International Association (PCMCIA).

21 Claims, 9 Drawing Sheets

DISK DRIVE WITH RAIL MOUNTING ARRANGEMENT

This application is a continuation of application Ser. No. 07/958,858, filed Oct. 8, 1992, now abandoned.

FIELD OF THE INVENTION

This invention relates to a disk drive useable in place of a printed circuit memory card in a personal computer and, in particular, to a disk drive meeting the specifications established by the Personal Computer Memory Card International Association.

BACKGROUND OF THE INVENTION

Integrated circuit memory cards have become popular as a means of conveniently adding memory capacity to personal computers, particularly palm top, lap top, and notebook-sized computers, as well as other devices such as modems, serial ports, cellular phone links, facsimile machines, application read-only memories, etc. To promote compatibility among memory cards, physical, interface and software standards have been adopted by the Personal Computer Memory Card International Association (PCMCIA) in the United States and by the Japan Electronics Industry Development Association (JEIDA). The current PCMCIA Card Standard (Release 2.0, September 1991), which is incorporated herein by reference, provides for two physical sizes, designated Type I and Type II, which are distinguished from each other primarily by specifying card thicknesses of 3.3 mm and 5.0 mm, respectively. The memory cards are provided with a 68-pin socket connector at one end and are typically guided into place by a pair of channel guides which engage the side edges of the card.

Integrated circuit memory cards permit up to about 20 megabytes of storage to be added to the host computer. Recently, it has been proposed that the PCMCIA adopt several additional size standards, designated Type III and Type IV, specifying card thicknesses of 10.5 mm and a greater thickness in the range 12.5–18.0 mm. These larger sizes raise the possibility of substituting a small disk drive, having disks 1.8 inches in diameter, for example, in place of the solid state memory. This would permit a substantially larger memory capacity, e.g., 100 megabytes, to be added to the host computer.

At present, disk drives are generally mounted in small computers by means of screw fasteners and are connected electrically by means of a cable and a connector. Alternatively, the drive may have a built-in connector and may be mounted onto the computer directly with some type of retaining means. A disk drive compatible with PCMCIA specifications could more easily be mounted in a computer, without special technical training or extra hardware, either as a part of the manufacturing process or as a field replacement or upgrade. Such a drive could also be used as a removable storage device.

SUMMARY OF THE INVENTION

A disk drive in accordance with this invention comprises a pair of side rails and a connector, both the side rails and the connector being firmly mounted to the disk drive. In a preferred embodiment, both the side rails and the connector meet the standards issued or proposed for adoption by the PCMCIA for memory cards. In particular, the connector is a socket connector having a two row, 1.27 mm grid, capable of receiving 68 pins. The side rails each have a height of 3.3 mm, and the outside edges of the side rails are spaced 54 mm apart. Thus, the side rails are properly dimensioned and spaced so as to fit into the channel guides for a standard PCMCIA memory card.

In the preferred embodiment the side rails are integrally formed as part of a base housing on which the spin motor assembly, actuator and other components of the drive are mounted. In an alternative embodiment, the side rails are separate elements which are attached to the edges of a printed circuit board (PCB) on which the integrated circuits are mounted.

DESCRIPTION OF THE INVENTION

Two embodiments in accordance with this invention will be described. The preferred embodiment, illustrated in FIGS. 1–3, includes a base housing with which the side rails are integrated and to which the connector is firmly attached. The second embodiment, illustrated in FIGS. 4–6, includes separate side rails which are attached to the respective side edges of the disk drive printed circuit board (PCB).

Figure 1A:
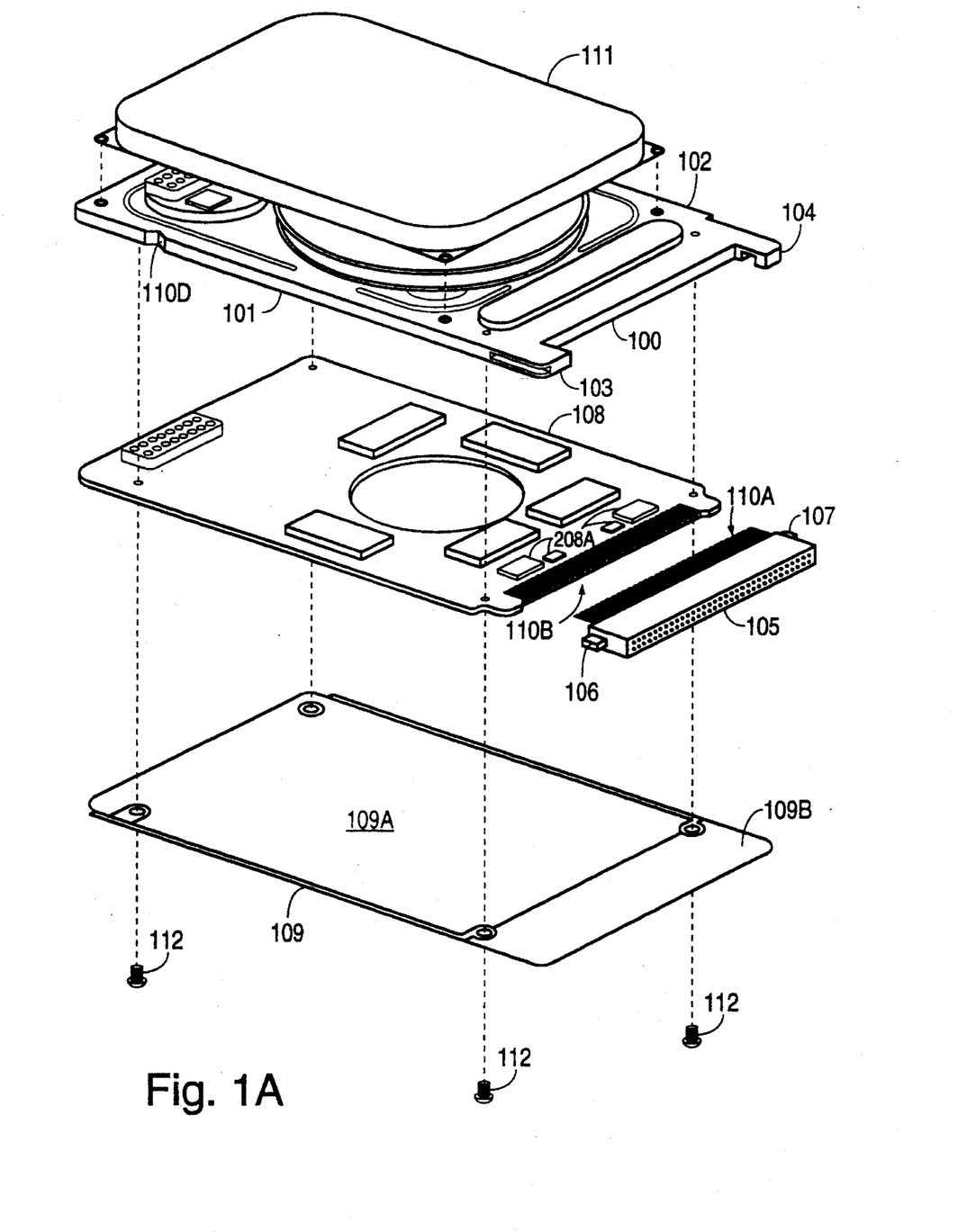
FIG. 1A illustrates an exploded view of a preferred embodiment in accordance with the invention.

FIG. 1A illustrates an exploded view of a disk drive 10. A base housing 100, which is preferably formed of aluminum, although plastic or steel may also be used, includes side rails 101 and 102. Side rails 101 and 102 terminate in connector mounting structures 103 and 104, respectively. A connector 105, which is a 68-pin PCMCIA-compatible socket connector, has tabs 106 and 107 which mate with slots formed in structures 103 and 104. Tabs 106 and 107 are fitted into the corresponding slots in structures 103 and 104 to provide a firm connection between connector 105 and base housing 100. This results in an extremely rugged, durable arrangement which will maintain its integrity after repeated insertion into a computer. Connector 105 is advantageously a multiple insertion connector such as Elco Corporation Part No. CH96 1800 0011 00 0005.

Sandwiched to base housing 100 are a printed circuit board (PCB) 108 and a shield member 109, which includes an insulating layer 109A bonded to an ESD shield 109B. A set of contacts 110A on connector 105 are electrically bonded to opposing contacts 110B on PCB 108. A die cast aluminum cover 111 fits over the disks, actuator and other elements which are mounted on base housing 100 and is mounted to base housing 100 by means of four screws (not shown). The sandwich assembly of base housing 100, PCB 108 and shield member 109 is held together by a set of screws 112 which are threaded into base housing 100. The insertion of tabs 106 and 107 into the slots in structures 103 and 104 forms a rigid structural unit and removes stress from PCB 108 when disk drive 10 is inserted into a computer or other device.

Base housing 100 includes a V-shaped notch 100D which mates with a suitable means (e.g., a spring-loaded ball or tab) to retain the disk drive firmly in position after it has been mounted in a computer or other instrument. Other suitable retention means (e.g., an external spring finger) may also be used, and a retention means may be provided on each side of disk drive 10.

Figure 1B:
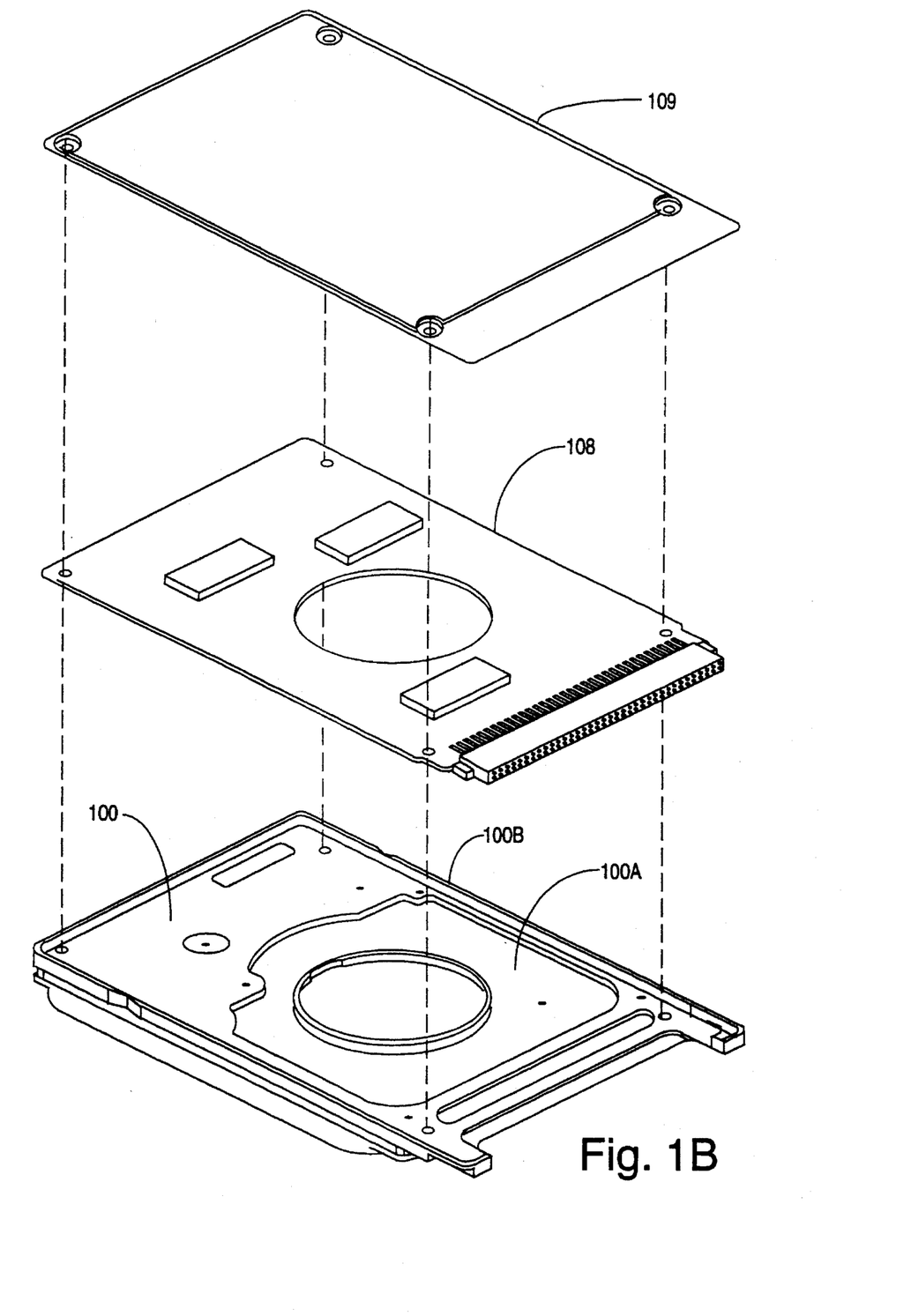
FIG. 1B illustrates an exploded view of the same embodiment, with the disk drive inverted.

FIG. 1B is a view of the same embodiment which has been inverted. It will be noted that base housing 100 includes a cavity 100A which provides room for chips or other components mounted on the side of PCB 108 which faces base housing 100. Base housing 100 also includes a peripheral lip 100B (more clearly visible in FIG. 1C) which provides support for the edges of shield member 109.

Figure 1C:
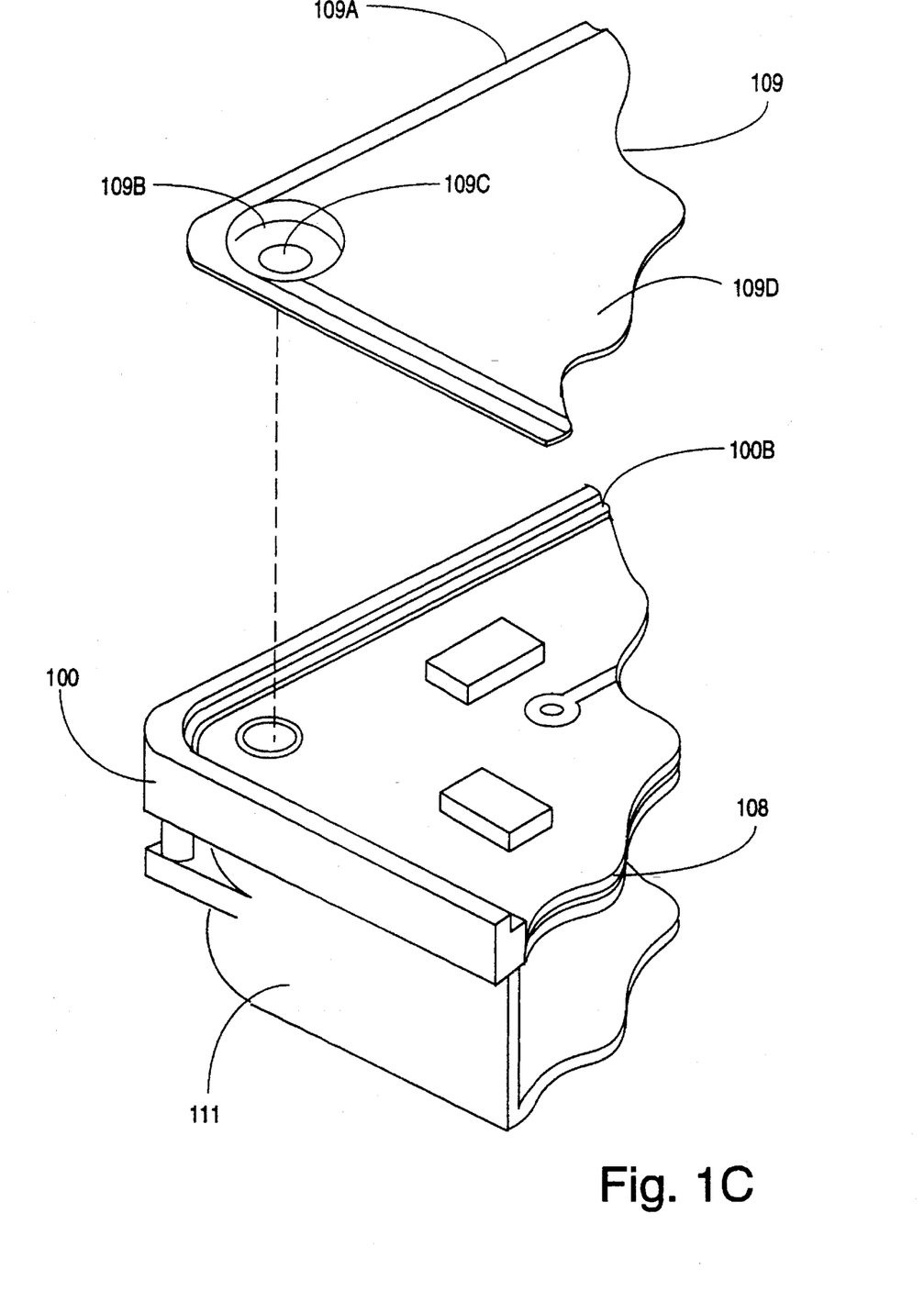
FIG. 1C illustrates a detailed view of a corner of the same embodiment.

This structure is shown in greater detail in FIG. 1C, which shows PCB 108 positioned against base housing 100. An edge 109A of shield member 109 mates with lip 100B so that a main portion 109D of shield member 109 is spaced somewhat from PCB 108. Main portion 109D is also raised from edge 109A to provide greater clearance from printed circuit board 108. (This structure is clearly visible in FIG. 2B.) A concave portion 109B is formed around screw hole 109C, the depth of concave portion 109B being adjusted such that the edge of hole 109C touches PCB 108. In this way base housing 100 and shield member 109 form a completely shielded cavity for PCB 108 and any components mounted thereon. No separate housing or "box" to shield these components is required. This assumes, of course, that base housing 100 is made of a metal. The firm pressure between edge 109A and lip 100B provides a dust tight seal which protects PCB 108 and the other components mounted in the cavity. The overlap between edge 109A and lip 100B improves the shielding capability of the structure (see *Noise Reduction Techniques in Electronic Systems,* Henry W. Ott, John Wiley & Sons (1988) , FIGS. 6–26).

Figure 2A:
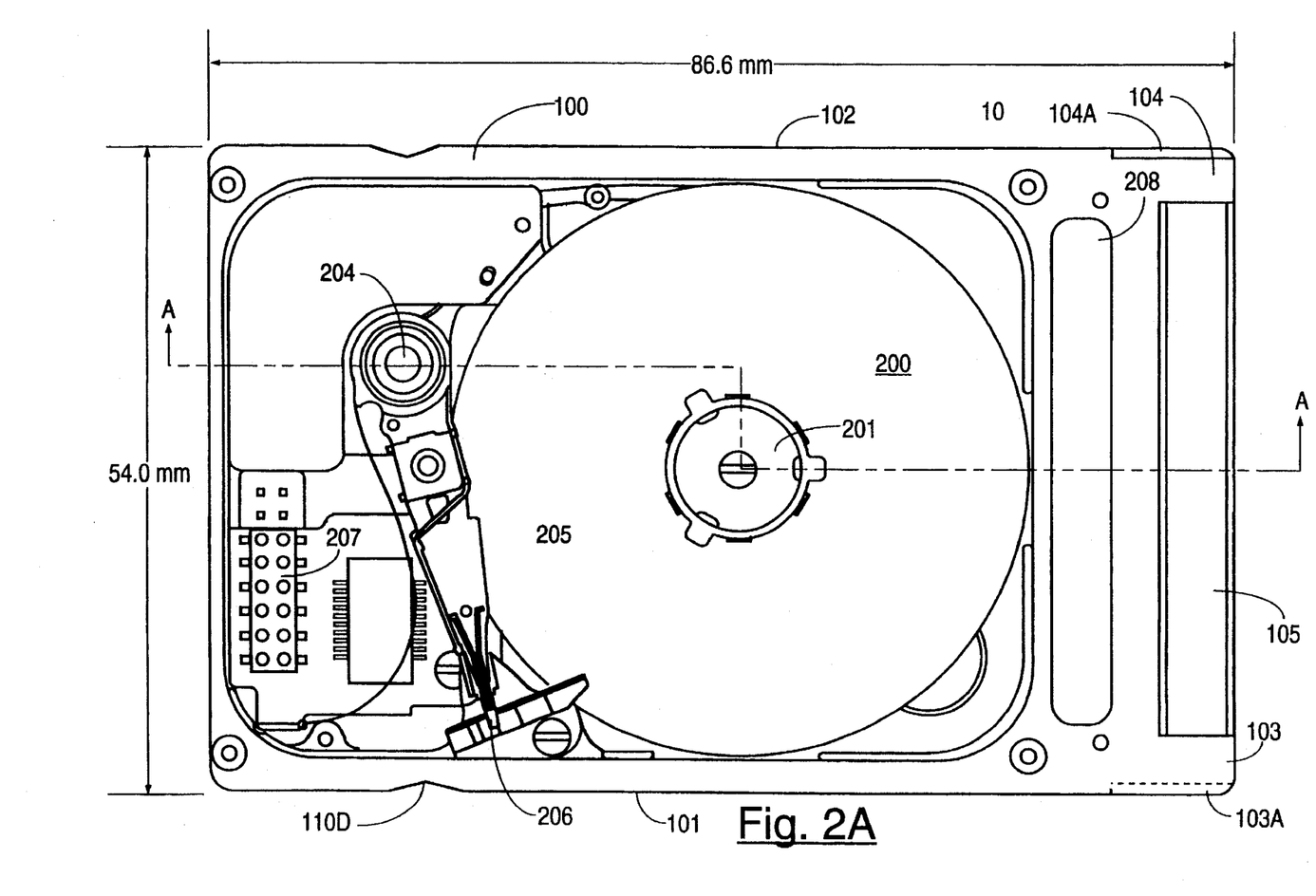
FIG. 2A illustrates a plan view of the preferred embodiment.
Figure 2B:
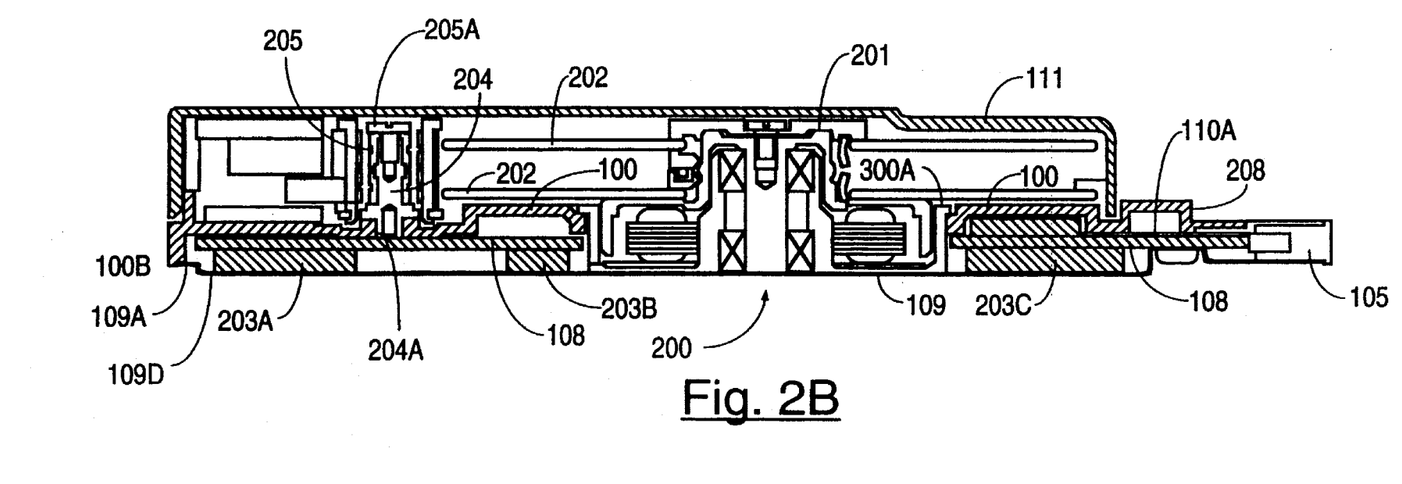
FIG. 2B illustrates a cross-sectional view taken at section A—A in FIG. 2A.
Figure 2C:
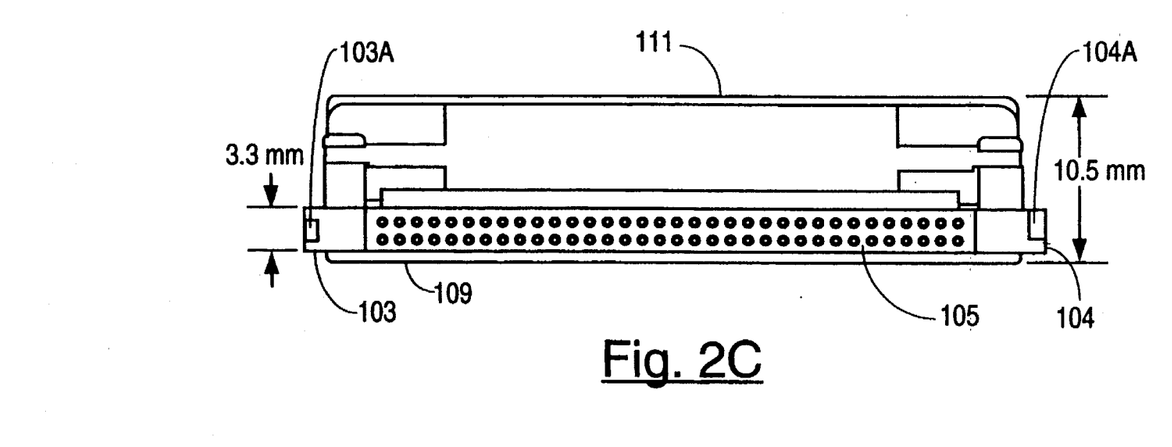
FIG. 2C illustrates a front elevational view taken from the connector end of the disk drive illustrated in FIG. 2A.

FIGS. 2A, 2B and 2C illustrate in greater detail the positioning of the various components inside disk drive 10. FIG. 2A is a detailed top view of disk drive 10 with cover 11 removed. FIG. 2B is a cross-sectional view taken at section A—A (shown in FIG. 2A), with cover 111 in place.

As shown in FIG. 2B, a spin motor assembly 200 is mounted into an aperture in base housing 100. Spin motor assembly 200 includes a spindle 201 which protrudes through the aperture and to which a pair of data storage disks 202 are affixed. Spin motor assembly 200 is adhesively bonded to a lip 300A of an aperture 300 in base housing 100 (see FIG. 3A). PCB 108 lies directly beneath base housing 100 and has attached to it components represented by 203A, 203B and 203C. Thus, printed circuit board 108 and its components, including components 203A–203C, are set in a cavity which is shielded by shield 109 on the bottom and base housing 100 on the top.

An actuator bearing cartridge 204 is mounted on top of base housing 100 by inserting a post on the end thereof into a hole 204A in base housing 100. Alternatively, actuator bearing cartridge 204 may be attached to base housing 100 by screw fasteners or bonding. An actuator 205 is fastened to a post on actuator bearing cartridge by means of a screw 205A. Actuator 205 contains heads 206 to read and write data to disks 202. A connector 207 projects through an aperture in base housing 100 and permits electrical signals to be transmitted between PCB 108 and the components mounted on top of base housing 100. While a dynamic loading drive is illustrated in FIGS. 1–3, the principles of this invention also apply to contact start stop (CSS) drives.

As shown in FIG. 2B, base housing 100 also includes an enclosure 208 which provides a shield for connectors 110A and 110B and also encloses four IC chips 208A shown in FIG. 1A.

Disk drive 10 is designed to meet the PCMCIA Type III specification, which is currently proposed. This requires that disk drive 10 have a length of 86.6 mm and a width of 54.0 mm. These dimensions are indicated on FIG. 2A. In addition, the Type III specification requires that side rails 101 and 102 have a thickness of 3.3 mm and that the total height of disk drive 10 not exceed 10.5 mm. These dimensions are shown in FIG. 2C. In addition, FIG. 2C illustrates polarization features which are included in structures 103 and 104 in accordance with PCMCIA specifications, including a slot 103A in structure 103 and a recess on the upper edge of structure 104. In accordance with PCMCIA specifications, these features extend a distance of 10.0 mm back from the front edge of connector 105.

Figure 3A:
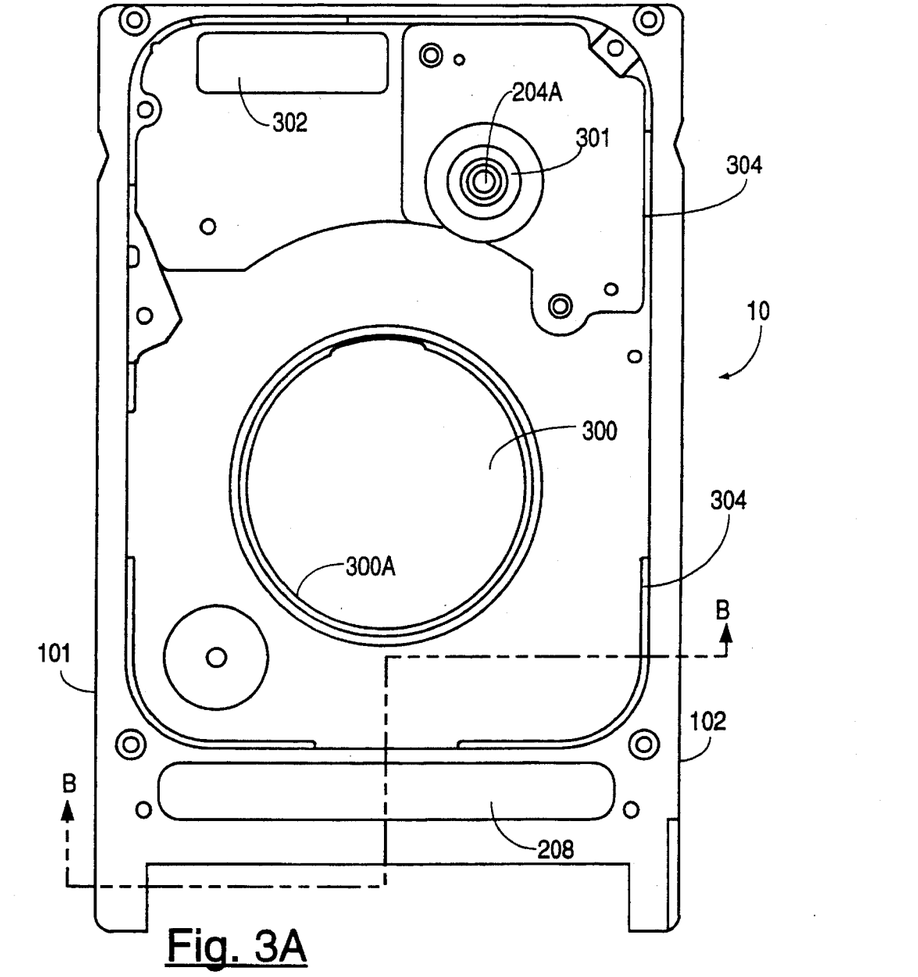
FIG. 3A illustrates a plan view of the base housing, with the cover, spin motor assembly, actuator and disks removed.
Figure 3B:
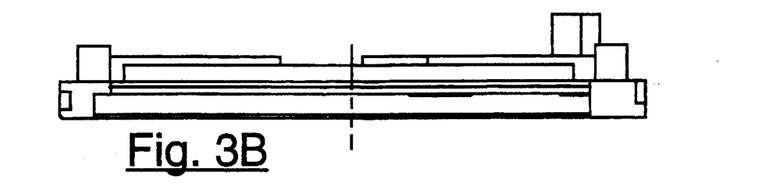
FIG. 3B illustrates a front elevational view of the structure illustrated in FIG. 3A.
Figure 3C:
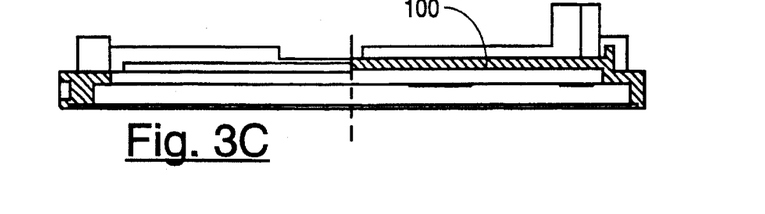
FIG. 3C illustrates a cross-sectional view of the structure illustrated in FIG. 3A, taken at section B—B.

FIG. 3 illustrates several features of base housing 100 which are not apparent from FIGS. 1 and 2. FIG. 3 shows an aperture 300 which is formed in base housing 100 and a lip 300A to which spin motor assembly 200 is bonded. Also a structure 301 for mounting actuator bearing 204 is indicated, as is an aperture 302 for connector 207. The edges of cover 111 fit around a wall 304 which extends partially around the perimeter of disk drive 10. FIG. 3C illustrates a cross-sectional view of base housing 100 taken at section B—B shown in FIG. 3A.

It will be appreciated that the principles of this invention are not limited to the Type III PCMCIA specification. For example, disk drive 10 could be constructed in accordance with the PCMCIA Type IV or Type V proposed specifications, which are similar to the Type III specification but allow an overall height of 12.5 mm or 15.0 mm, respectively. Disk drive 10 may also be constructed without regard to any PCMCIA specification.

Figure 4:
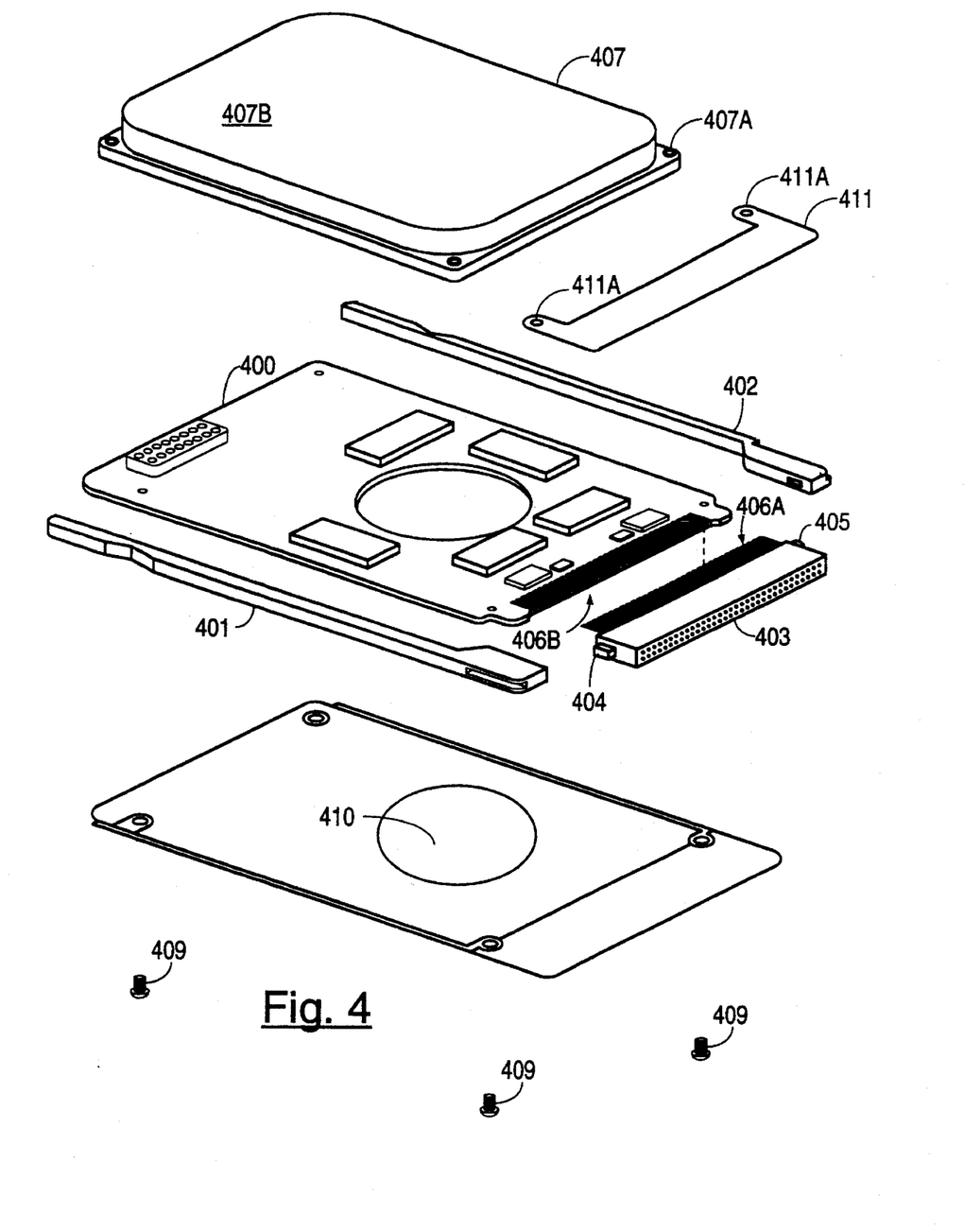
FIG. 4 illustrates an exploded view of a second embodiment according to the invention.
Figure 6A:
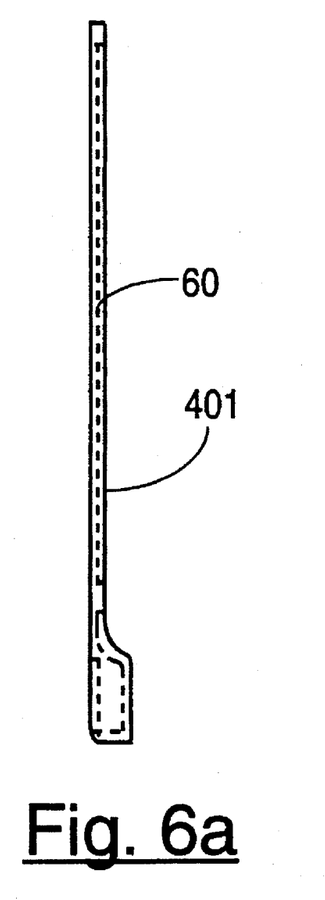
FIGS. 6A and 6B illustrate plan and side views, respectively, of one of the side rails illustrated in FIG. 4.
Figure 6B:
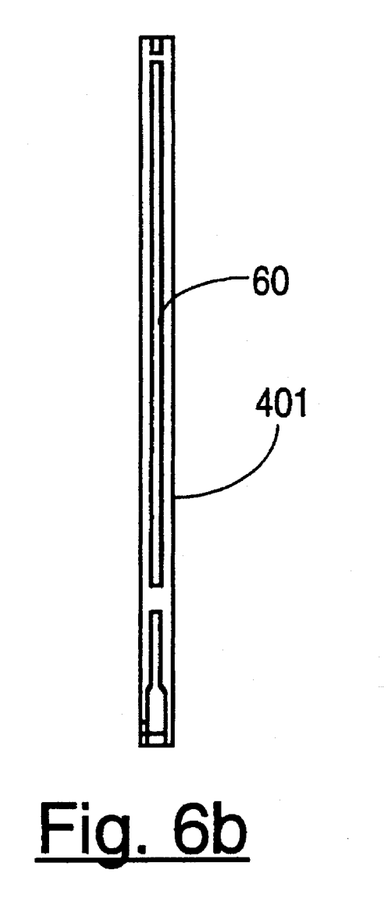

FIG. 4 illustrates an exploded view of an alternative embodiment in accordance with the invention. Included in a disk drive 40 is a PCB 400, on which are mounted several integrated circuit chips and other electronic components. A pair of side rails 401 and 402 are attached to the edges of PCB 400. As shown in FIGS. 6A and 6B, side rail 401 has a groove 60 on its inside face into which an edge of PCB 400 is fitted. The edge of PCB 400 is bonded into groove 60 with a suitable adhesive (for example, LOCTITE brand adhesive). Side rail 402 is bonded in a similar manner to the opposite edge of PCB 400.

Referring again to FIG. 4, a connector 403, which advantageously conforms to PCMCIA specifications, has tabs 404 and 405 which fit into corresponding recesses in side rails 401 and 402. Tabs 404 and 405 are securely fitted into side rails 401 and 402 to increase the rigidity of the structure. Leads 406A on connector 403 are electrically connected to contacts 406B on PCB 400. A shielding plate 411 provides electrostatic and electromagnetic shielding for leads 406A and contacts 406B. A head disk assembly 407 which includes a spin motor assembly, disk and activator, is attached to PCB 400 by means of four screws (not shown) which fit through holes 407A, two of which extend also through tabs 411A of shield 411. A shield 408 is attached to the underside of PCB 400 by screws 409. A cover 407B of head disk assembly 407 and shield 408 provide electrostatic and electromagnetic shielding for the components on PCB 400. A circular aperture 410 in shield 408 provides room for a lower surface of the spin motor assembly (not shown) in head disk assembly 407. Aperture 410 may be omitted in some embodiments.

Figures 5A, 5B:
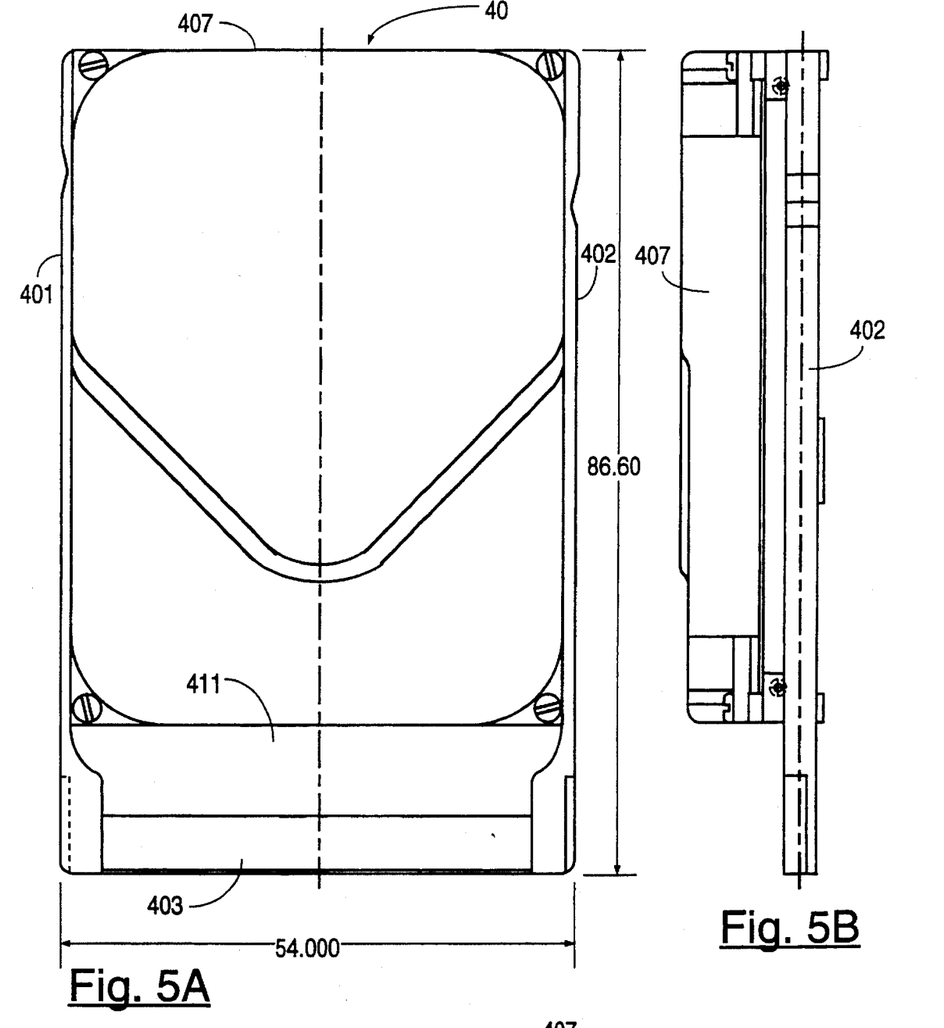
FIGS. 5A, 5B and 5C illustrate plan and side and front elevational views, respectively, of the embodiment illustrated in FIG. 4.
Figure 5C:
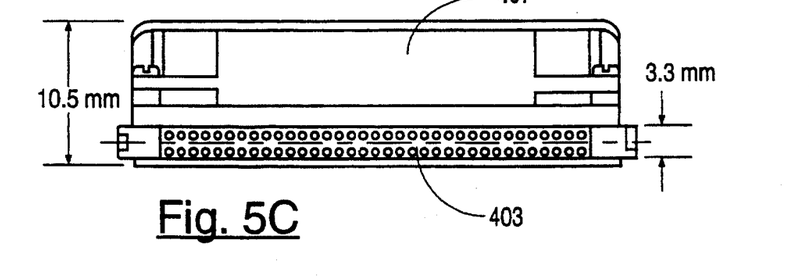

A plan view and side and front elevational views of disk drive 40 are illustrated in FIGS. 5A, 5B and 5C. From FIG. 5C it is apparent that side rails 401 and 402 contain polarization features similar to those illustrated in FIG. 2C. In addition, the height of side rails 401 and 402, and the other dimensions of disk drive 40, comply with the PCMCIA Type III specification.

The embodiments described above are intended to be illustrative and not limiting. Many additional and alternative embodiments will be apparent to those skilled in the art, all of which are included within the broad principles of this invention, as defined in the following claims.

I claim:

1. A disk drive comprising:

a base housing member, said base housing member comprising a generally planar body on which a spin motor assembly and an actuator are mounted and extending from a first side of said disk drive to a second side of said disk drive, said base housing member terminating in a pair of side rails, said side rails being oriented parallel to each other and extending laterally outward from opposite sides of said disk drive;

a cover attached to said base housing member, said cover and said base housing member together forming a cavity which encloses one or more recording disks; and an electrical connector rigidly fixed to respective ends of said side rails, said electrical connector being oriented so as to mate with a corresponding electrical connector when said disk drive is moved in a direction parallel to said side rails;

wherein said pair of side rails are configured for sliding into a pair of channel guides included in a memory card slot in a computer or other instrument.

2. The disk drive of claim 1 wherein said base housing member comprises a metal.

3. The disk drive of claim 2 wherein said base housing member comprises aluminum.

4. The disk drive of claim 1 wherein said electrical connector is a socket connector.

5. The disk drive of claim 4 comprising a printed circuit board attached to a surface of said base housing member outside of said cavity.

6. The disk drive of claim 4 further comprising:

a plurality of electronic components for controlling said disk drive, said electronic components being mounted on said printed circuit board; and a shield member attached to said base housing member, wherein said base housing member and said shield member are configured so as to form a second, electrostatically and electromagnetically shielded cavity in which said electronic components are enclosed.

7. The disk drive of claim 1 wherein said side rails are approximately 3.3 mm thick and outside edges of said side rails are approximately 54 mm apart.

8. The disk drive of claim 1 comprising means for retaining said disk drive in position when said side rails are disposed within said channel guides.

9. The disk drive of claim 1 wherein at least one of said side rails includes a polarization feature to ensure that said disk drive is oriented correctly when mounted.

10. The disk drive of claim 1 wherein said base housing member comprises a plastic.

11. The disk drive of claim 1 wherein each of said side rails is rectangular in cross section.

12. The disk drive of claim 1 wherein a horizontal centerline of each of said pair of side rails is aligned with a horizontal centerline of said electrical connector.

13. In a computer or other instrument, a combination comprising:

a pair of channel guides mounted in said computer or other instrument, said channel guides being adapted so as to receive a memory card;

a first electrical connector mounted in said computer or other instrument; and a disk drive comprising:

a base housing member, said base housing member comprising a generally planar body on which a spin motor assembly and an actuator are mounted and extending from a first side of said disk drive to a second side of said disk drive, said base housing member terminating in a pair of side rails, said side rails being oriented parallel to each other and extending laterally outward from opposite sides of said disk drive;

a cover attached to said base housing member, said cover and said base housing member together forming a cavity which encloses one or more recording disks; and a second electrical connector rigidly fixed to respective ends of said side rails;

wherein each of said side rails is slideably disposed in one of said channel guides and said first electrical connector is mated with said second electrical connector.

14. The combination of claim 13 wherein said disk drive comprises a means of retaining said side rails in position in said channel guides.

15. A disk drive comprising:

a head disk assembly, said head disk assembly including a spin motor, an actuator and a disk;

a rigid printed circuit board having a pair of side edges, said printed circuit board being attached to said head disk assembly;

a pair of side rails, each of said side rails having a groove running longitudinally along a surface thereof, a side edge of said printed circuit board being fitted securely into said groove such that said side rails are rigidly attached to said printed circuit board, said side rails being oriented parallel to each other; and an electrical connector rigidly fixed to respective ends of said side rails, said electrical connector being oriented so as to mate with a corresponding electrical connector when said disk drive is moved in a direction parallel to said side rails;

wherein said side rails are configured for sliding into a pair of channel guides included in a memory card slot in a computer or other instrument.

16. The disk drive of claim 8 wherein said electrical connector is fixed to each of said side rails by means of a tab on said connector inserted into a recess in said side rail.

17. The disk drive of claim 6 wherein said electrical connector is a socket connector.

18. The disk drive of claim 6 wherein said side rails are approximately 3.3 mm thick and said edges are approximately 54 mm apart.

19. The disk drive of claim 6 comprising means for retaining said disk drive in position when mounted in a computer or other instrument.

20. The disk drive of claim 6 wherein at least one of said side rails includes a polarization feature to ensure that said disk drive is oriented correctly when mounted.

21. The disk drive of claim 6 further comprising:

a shield member positioned adjacent an underside of said printed circuit board; and said head disk assembly comprises a cover member, said cover member and said shield member forming an electrostatically and electromagnetically shielded cavity in which said printed circuit board is enclosed.

* * * * *

UNITED STATES PATENT AND TRADEMARK OFFICE
CERTIFICATE OF CORRECTION

PATENT NO.   :   5,502,604
DATED        :   March 26, 1996
INVENTOR(S)  :   David M. Furay It is certified that error appears in the above-identified patent and that said Letters Patent is hereby corrected as shown below:

On the title page, under the heading "U.S. PATENT DOCUMENTS", the following is added:

5,041,924    8/1991    Blackborow et al. . . . . . .360/69
5,140,478    8/1992    Yoshida . . . . . . . . . .360/97.01

FOREIGN PATENT DOCUMENTS 0348165      12/1989    Europe

Signed and Sealed this

Twenty-second Day of April, 1997

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO.   :   5,502,604
DATED        :   March 26, 1996
INVENTOR(S)  :   David M. Furay It is certified that error appears in the above-identified patent and that said Letters Patent is hereby corrected as shown below:

Column 5, line 57, "4" should read --5--.

Column 6, line 63, "8" should read --15--.

Column 6, line 66, "6" should read --15--.

Column 7, line 1, "6" should read --15--.

Column 7, line 4, "6" should read --15--.

Column 7, line 7, "6" should read --15--.

Column 7, line 10, "6" should read --15--.

Signed and Sealed this

Third Day of March, 1998

*Attest:*

BRUCE LEHMAN

*Attesting Officer*  *Commissioner of Patents and Trademarks*